UNITED STATES PATENT OFFICE.

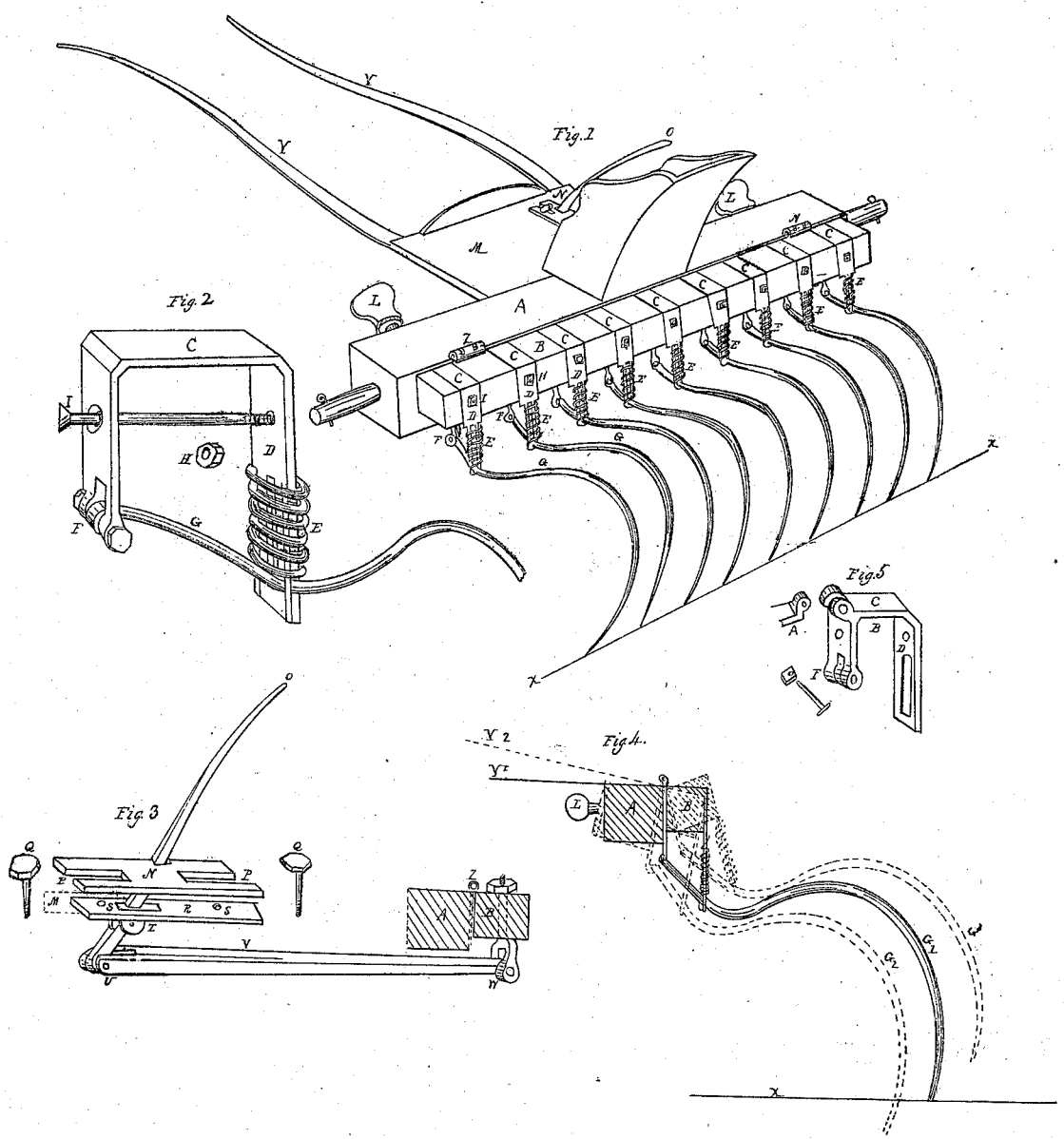

WM. H. LONG, OF LANCASTER, PENNSYLVANIA.

IMPROVEMENT IN HORSE-RAKES.

Specification forming part of Letters Patent No. 23,098, dated March 1, 1859.

*To all whom it may concern:*

Be it known that I, WILLIAM H. LONG, of the city of Lancaster, in the county of Lancaster and State of Pennsylvania, have invented new and useful Improvements on Iron-Toothed Lever Horse-Rakes; and I do hereby declare that the following is a full, clear, and exact description of the improvement and operation of the same, reference being had to the annexed drawings, making a part of this specification, in which—

Figure 1 is a perspective view of the entire combination, the wheels excepted. Fig. 2 represents one of the teeth-supporters C, with the tooth G, hinged at F, kept down by the coiled spring E in the groove or slit D, bolted onto the tooth-beam B by the flat-headed and countersunk bolt I, the screw, and nut H. Fig. 3 is a view of the shifting lever-plate N on the foot-board M of the rake, the set and binding screws Q, between the slits P, entering the fulcrum-plate R at S, beneath the foot-board M, Fig. 1. Fig. 4 is a descriptive view of the operation of the regulating-screws L, Fig. 5; also a tooth-supporter, like that of Fig. 2, with an additional hinge on top to attach the tooth-beam B to a counterpart on the axle-beam A, with a bolt, screw, and nut, may be substituted.

The regulating-screws L enter a nut in the axle-beam A, by means of which the hinged tooth-beam B is thrown up or out below with its teeth-supporters and the points of the teeth elevated from $G'$ to $G^3$ above the ground-line X, Fig. 4, to obviate the consequent depression of the teeth when a taller horse is used, which, by raising the shafts from $Y'$ to $Y^2$, brings the teeth below the ground-line X to $G^2$—a common fault in other rakes of this class. The ordinary lever to dislodge the contents of the rake O, Fig. 3, V W, &c., by means of the shifting-plate N and binding-screws Q, is readily adjusted to any alteration in the tooth-beam B by the screws L. The spiral springs over the teeth, as shown, is also a decided improvement, and the teeth, being hinged at F, Fig. 2, by a bolt, screw, and nut, are easily replaced, when broken, without loss of time, while the teeth are less liable to break when going over stumps or stones than in any other known arrangement, and kept in place by the slot D in the support C, and the spring E, effectually, while raking.

The improvements are deemed simple, cheap, and of great use.

What I claim as my invention, and desire to secure by Letters Patent, is—

The arrangement of lever O, shiftings lever-plate N, and tooth-beam B, with axle A and regulating-screw L, the whole being constructed and operated as and for the purpose herein set forth.

WILLIAM H. LONG.

Witnesses:
 JACOB STAUFFER,
 SAMUEL M. BRICKER.